United States Patent [19]

Waters

[11] Patent Number: 5,936,615
[45] Date of Patent: Aug. 10, 1999

[54] IMAGE-BASED TOUCHSCREEN

[75] Inventor: Keith Waters, West Newton, Mass.

[73] Assignee: Digital Equipment Corporation, Maynard, Mass.

[21] Appl. No.: 08/712,970

[22] Filed: Sep. 12, 1996

[51] Int. Cl.$^6$ .................................................. G09G 5/00
[52] U.S. Cl. ........................................ 345/173; 345/156
[58] Field of Search ..................................... 345/156, 173, 345/174, 175, 180, 181, 182, 183, 157, 158, 7, 9, 8; 178/18.1, 18.01

[56] References Cited

U.S. PATENT DOCUMENTS

| | | | |
|---|---|---|---|
| 4,644,582 | 2/1987 | Morishita et al. | 382/6 |
| 4,821,029 | 4/1989 | Logan et al. | 340/712 |
| 4,851,616 | 7/1989 | Langdon et al. | 178/18 |
| 4,873,398 | 10/1989 | Hubby, Jr. | 345/178 |
| 5,048,103 | 9/1991 | Leclerc et al. | 382/44 |
| 5,067,015 | 11/1991 | Combridge et al. | 358/133 |
| 5,105,186 | 4/1992 | May | 340/784 |
| 5,317,140 | 5/1994 | Dunthorn | 250/221 |
| 5,376,947 | 12/1994 | Kuroda | 345/173 |
| 5,483,261 | 1/1996 | Yasutake | 345/173 |
| 5,677,700 | 10/1997 | Sohwalba et al. | 345/173 |
| 5,736,975 | 4/1998 | Lunetta | 345/156 |
| 5,736,976 | 4/1998 | Cheung | 345/170 |
| 5,767,842 | 6/1998 | Korth | 345/173 |

FOREIGN PATENT DOCUMENTS

| | | |
|---|---|---|
| 0535988A2 | 10/1992 | European Pat. Off. . |
| 0718748A2 | 6/1996 | European Pat. Off. . |

OTHER PUBLICATIONS

"Registration of Images with Geometric Distortions," Ardeshir Goshtasby, IEEE Transactions on Geoscience and Remote Sensing, vol. 26, No. 1, Jan. 1988.

*Primary Examiner*—Xiao Wu
*Attorney, Agent, or Firm*—Cesari and McKenna, LLP

[57] ABSTRACT

In a touch activated computer system, a display terminal displays an image on a screen of the terminal. The image includes one or more visual option buttons arranged in a predetermined pattern. Each button corresponds to a specific application program which can be executed by the system. A camera has a lens oriented to capture frames representing a scene in front of the screen. Each frame includes a plurality of regularized pixel values. The system includes an image registration subsystem for comparing the pixel values of successive frames. A particular application is selected for execution when the pixel values corresponding to that portion of the scene directly in front of a particular button differ in successive frames more than a predetermined threshold value.

12 Claims, 7 Drawing Sheets

IMAGE-BASED TOUCHSCREEN

FIELD OF THE INVENTION

This invention relates to computer systems, and more particularly to touch activated display screens.

BACKGROUND OF THE INVENTION

In certain situations, it is advantageous to control the operation of computer systems using "touchscreen" technologies. For example, touch activated information systems in public places do not require a keyboard or mouse, or other similar hard-to-use and easy-to-damage control devices.

In touch activated computer applications, the system displays images on a screen of a display terminal. The images can include visual option icons or "buttons," with appropriate legends. The user can activate processes corresponding to the visual buttons by pointing at, or "touching" the screen where the buttons are displayed.

Previous touch activated systems have generally sensed the presence of a finger, or pointing device on or near the display screen using capacitance, resistive, acoustic, mechanical, or optical sensors mounted directly on the screen, or around the periphery of the screen, for example, in the bezel of the display terminal.

These sensing techniques generally require a physical modification of the display terminal. For example, in capacitive and resistive systems, transparent layers of conductive and dielectric films are placed directly on the screen. With systems that are acoustically or optically activated, the transmitters and receivers are generally mounted in the bezel or housing surrounding the screen.

The problem with the prior art touch technologies is that the display terminal must be physically modified at an increased cost to receive the sensors. Specialized sensor interfaces and software must also be generated. It is desired to provide a touch activated system without the need to modify the display terminal.

SUMMARY OF THE INVENTION

The invention enables the activation of computer applications by pointing at or touching specific portions of a screen of a display terminal. A computer program displays an image on the screen. The image includes one or more visual option buttons, each button corresponding to a specific application program to be activated.

During operation of the system, a camera captures digitally encoded frames of a scene in from of the screen. The frames can include calibration frames, and selection frames. Each frame includes a plurality of digitally encoded pixels arranged in a regularized pattern. The pixels encode light intensity values.

While someone is "pointing" at the screen, the pixel values of a reference frame are compared with the pixels of a subsequent selection frame. The frames can be compared using image registration techniques. A specific computer application is selected for execution if the difference between the pixel values of a predetermined portion of the reference frame, and a corresponding portion of the selection frame exceeds a predetermined threshold value.

In one aspect of the invention, the camera is mounted above the display terminal with the lens pointing in a downward direction. The optical axis of the lens is in front of the screen. This allows for the detection of pixel motion in vertically oriented stripes or zones. If the camera is mounted along side the terminal pointing sideways, then the detection stripes or zones can be arranged horizontally.

In another aspect of the invention, a mirror is mounted in the scene viewed by the camera. The mirror is mounted at such an angle that the frames captured by the camera include a different view of the seen as reflected in the mirror. For example, if the mirror is mounted at an angle of about 45° with respect to the optical axis, then the view in the mirror is substantially perpendicular to the directly viewed scene. Pixels corresponding to the different view can be separately compared to allow application selection using a two-dimensional arrangement of the visual display buttons.

DETAILED DESCRIPTION OF PREFERRED EMBODIMENTS

Figure 1:
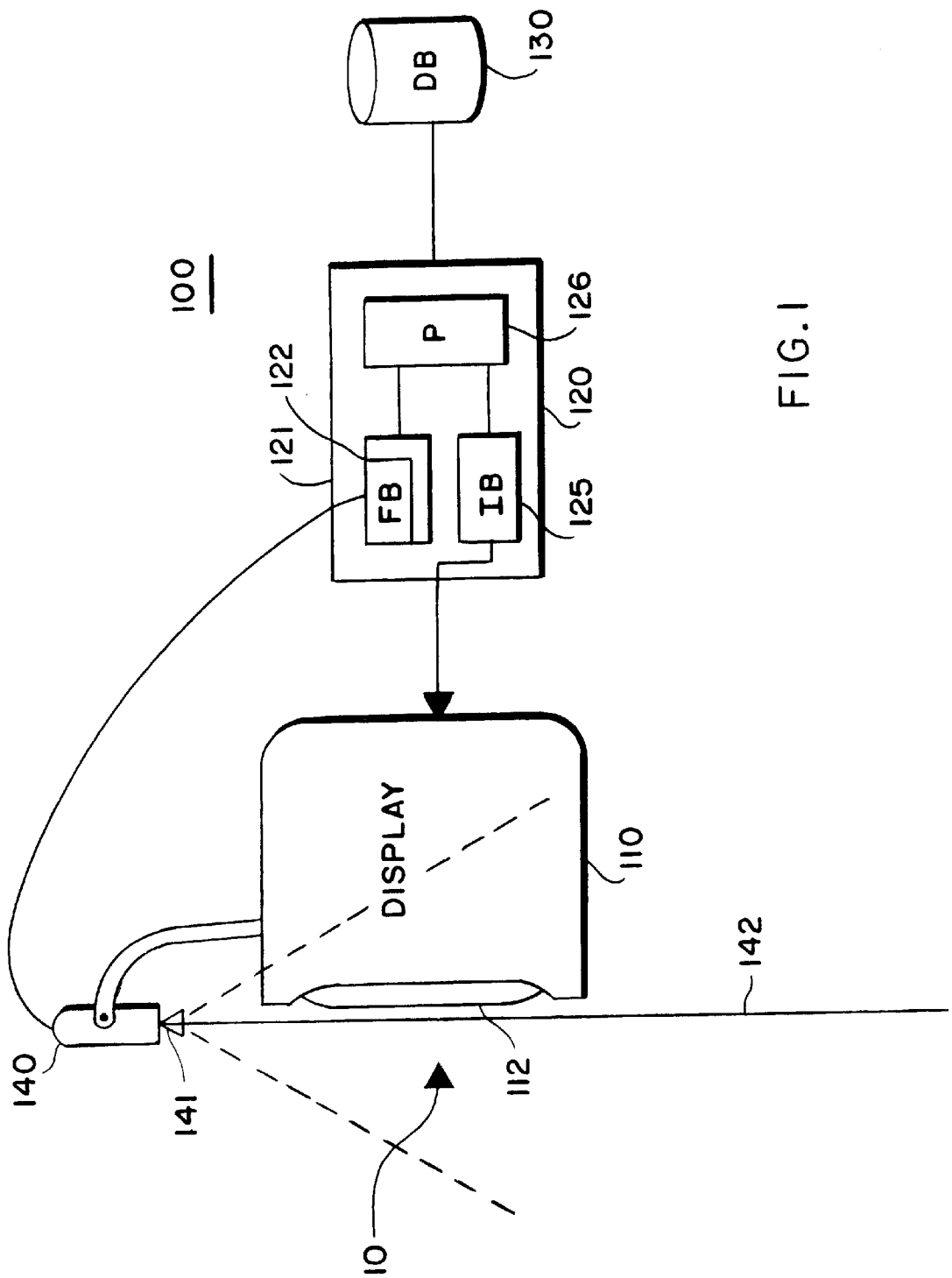
FIG. 1 is a block schematic of an image-based touch activated computer system according to the invention.

As shown in FIG. 1, an image-based touch system 100 includes a display terminal 110 having a display screen 112, an image processing system 120, and a storage subsystem 130. A camera 140 is centrally mounted above the display terminal 110 such that the lens 141 is substantially pointing downward. The optical axis 142 of the lens 141 is substantially parallel to the plane of display screen 112, and slightly in front of the screen 112.

The image processing subsystem 120 includes a video board 122 connected to the camera 140. The video board 122 includes an analog-to-digital (A/D) convertor, and a frame buffer (FB) for storing frames. The image processing subsystem 120 also includes an image processor 126 and an image buffer (IB) 125. The image processing subsystem 126 can include one or more central processing units (CPUs) connected to local dynamic random access memories (DRAM) by busses. The storage subsystem 130 can be used to persistently store programs and data used by the image processing subsystem 120 in a database (DB).

Figure 2:
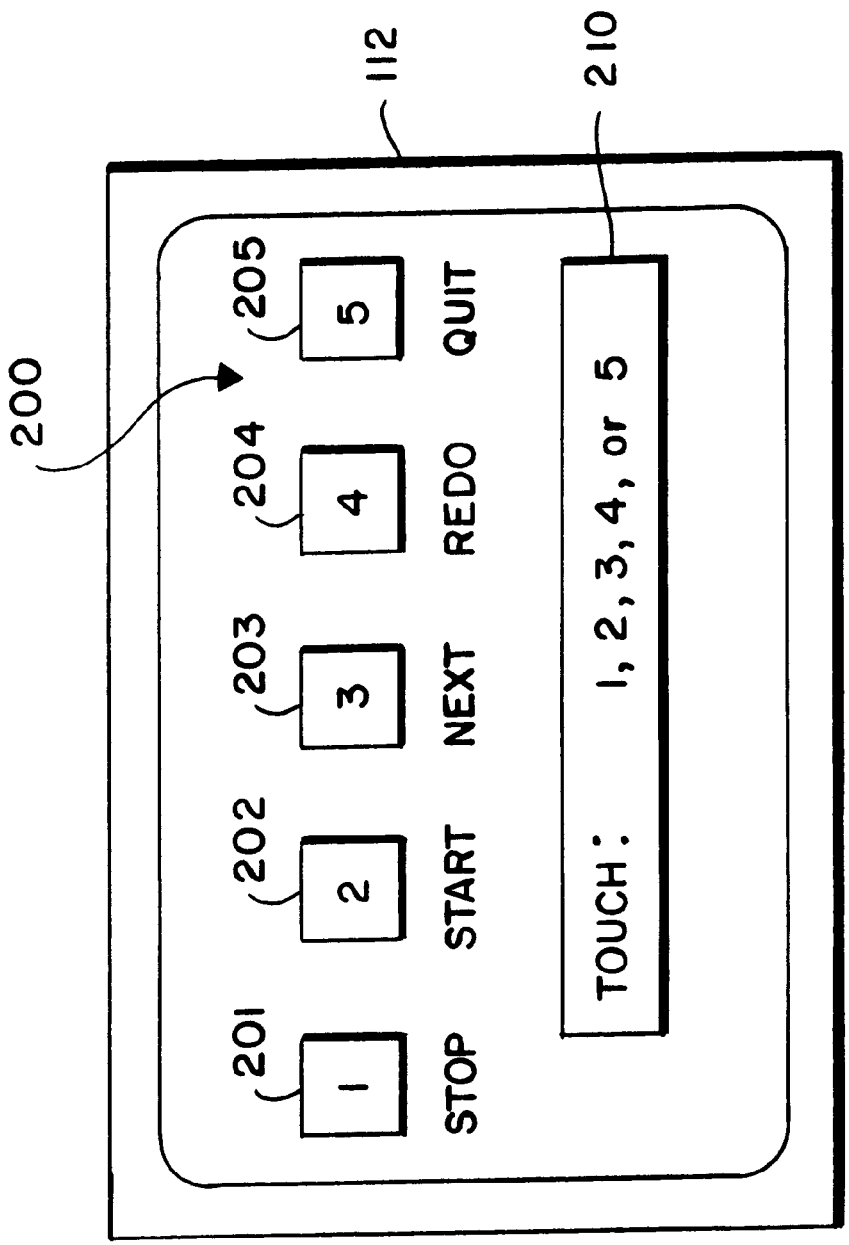
FIG. 2 is an image shown on a screen of the system of FIG. 1.
Figure 3:
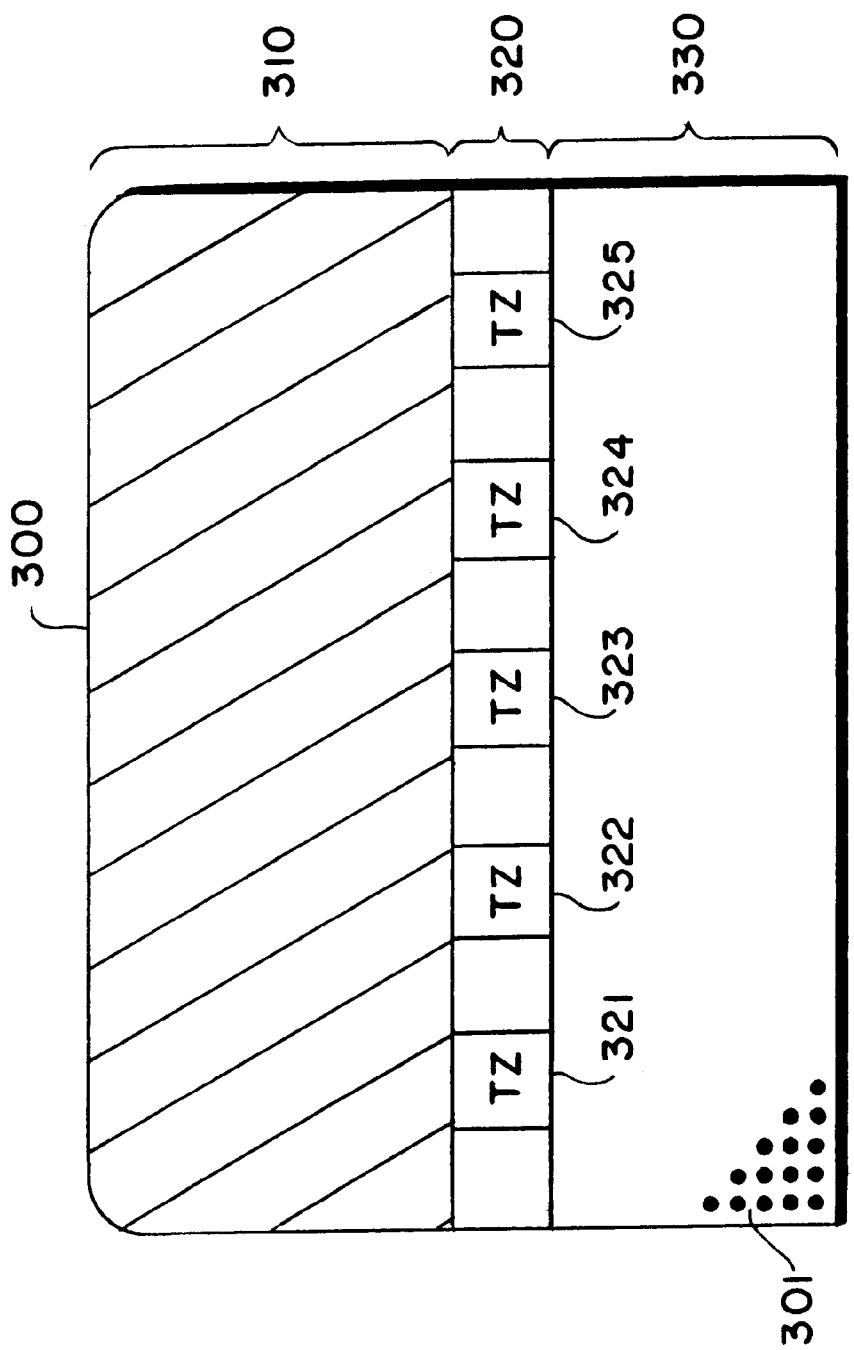
FIGS. 3–5 represent frames grabbed by a camera of the system of FIG. 1.

The operation of the system 100 is now described also with reference to FIGS. 2 and 3. The image processing subsystem 120 creates an image 200 in the image buffer 125 for display on the screen 112 of the terminal 110. The image 200 includes a plurality of visual option "buttons" 201–205 with appropriate legends, and an optional an instruction field 210.

As the image 200 is displayed, the camera 140 periodically captures or "grabs" frames, e.g., frame 300 of FIG. 3, representing the scene, generally indicated by reference numeral 10, in front of the display screen 112. The scene 10 is converted to digital signals which are stored as frames in the buffer 121 as a regularized pattern of pixels 301, for example, an array of 640×480 pixels. Each pixel 301 has an intensity value corresponding to a level of optical illumination of the scene.

FIG. 3 shows a "reference" frame 300 which is captured by the camera 110. The reference frame 300 includes three general portions 310, 320, and 330. The portions 310 (hashed) corresponds to the view of the top of the display terminal 110. Portion 320 corresponds to a narrow strip of the scene 10 immediately in front of the screen 112, e.g., the portion of the scene 10 which is closest to the optical axis 112 of the camera 140. The interface between portions 310 and 320 generally corresponds to a plane just in front of the surface of the screen 112. As will be described in further detail below, the width of the portion 320 can be adjusted to match an appropriate level of sensitivity to an actual "touching" of the screen 112. The portion 330 is that part of the scene 10 the furthest away from the screen 112. The pixels 301 of the reference frame 300 can be stored by the processing system 120 for later use.

The portion 320 of the frame 300 can be subdivided into a plurality of touch zones (TZ) 321–325 which are substantially aligned in front of the displayed visual option buttons 201–205 to provide "activation" areas. Each of the zones 321–325, for a particular visual button size, can be about 64×64 pixels.

In response to viewing the image 200 on the display screen 112, a user of the system 100, "points" at one of the visual buttons 201–205 using a finger or a pointing device. As the user is pointing at the screen 112, the scene 10 is captured as a sequence of frames by the camera 114. As described below, the rate of frame grabbing can depend on how fast the scene 10 is changing.

The selection frames are compared with the reference frame 300 to determine differences in pixel intensity values in the touch zones. Pixel differences can be determined using well known image registration techniques as described in U.S. Pat. No. 4,644,582, Image Registration Methods issued to Morishita et al., on Feb. 17, 1987, U.S. Pat. No. 5,048,103, Method for Automatic Resetting of Images, issued to LeClerc et al., on Sep. 10, 1991, U.S. Pat. No. 5,067,015, Method of Processing Video Image Data for use in the Storage or Transmission of Moving Digital Images, or as described in Registration of Images with Geometric Distortions, by A. Goshtabashy, IEEE Transactions on Geoscience and Remote Sensing, Vol. 26, No. 1, January 1988. Pixel differences can be used to detect localized "motion" or optical flow in the scene 10.

The rate at which frames can be grabbed can be determined by the relative total pixel difference between any two successive frames. If the pixel difference becomes larger than some predetermined threshold, a new reference frame can be grabbed for comparison with subsequent selection frames. The process of grabbing a new reference frame can be considered a recalibration step.

Figure 4:
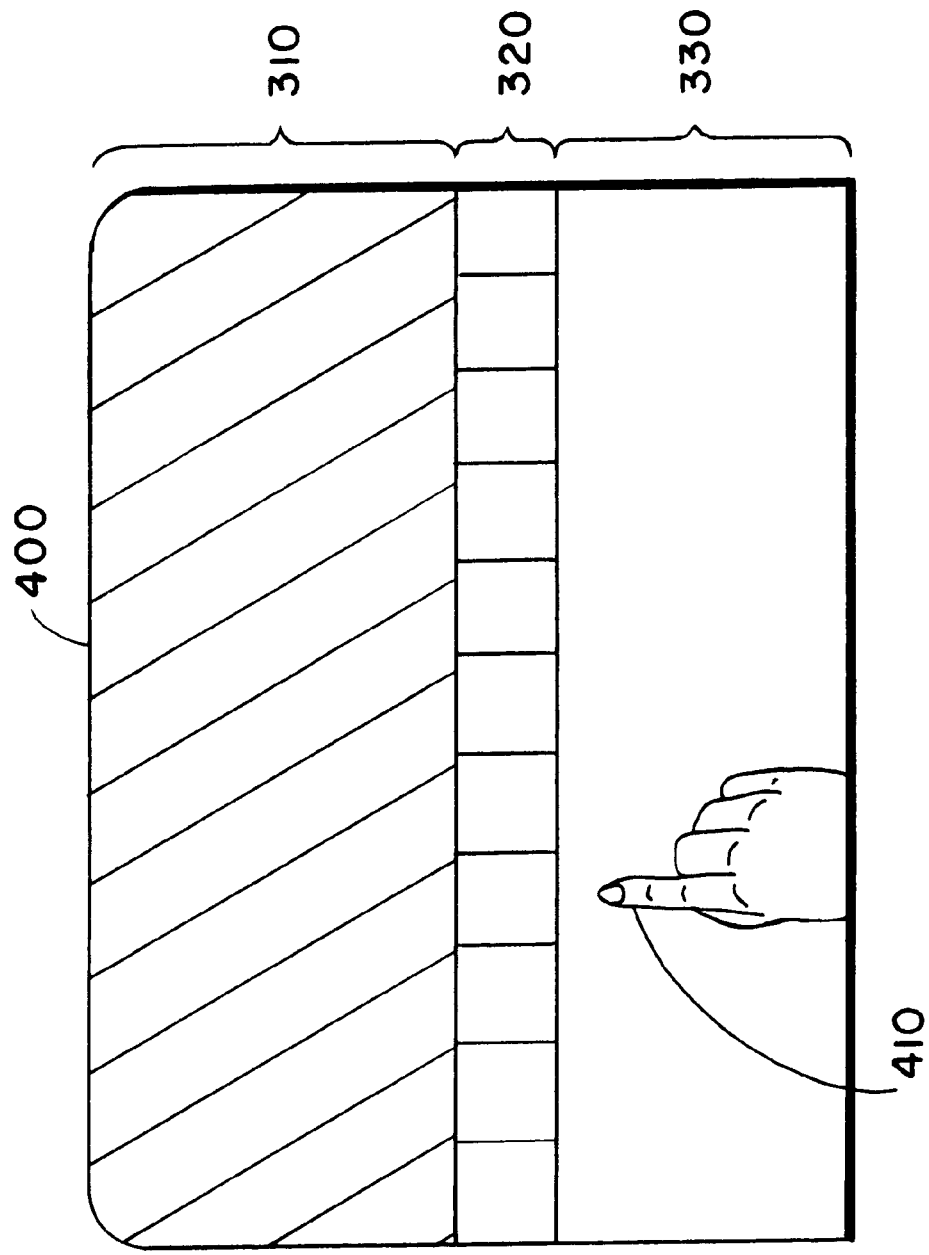

For example, selection frame 400 of FIG. 4 shows a hand and finger 410 entering the portion 330 of the scene 10 well away from the screen 112. Any substantial pixel motion in this portion exceeding a predetermined threshold can trigger a closer examination of the selection frames.

Figure 5:
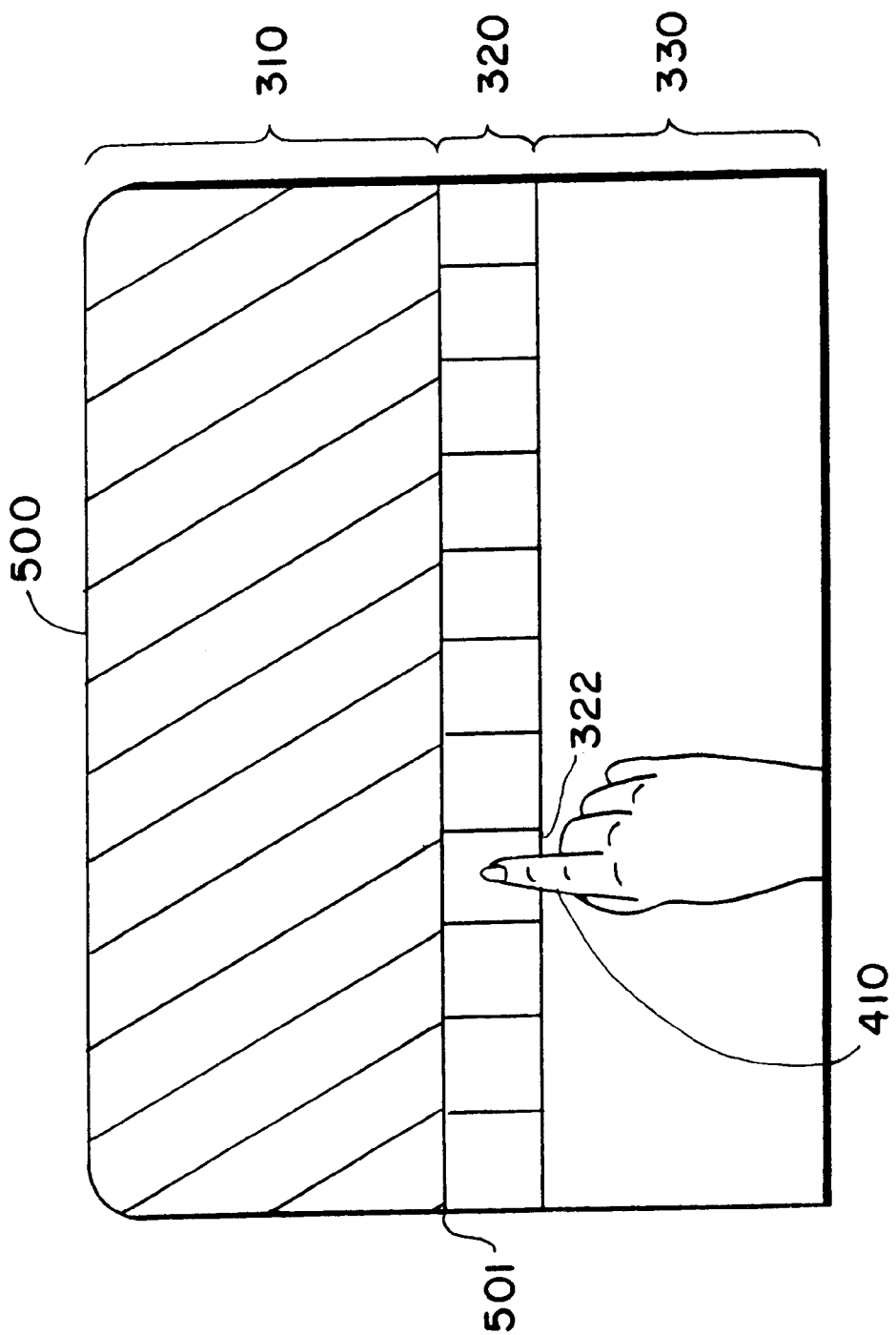

Selection frame 500 of FIG. 5 shows the finger 410 entering the touch zone 332. Pixel motion in this particular zone corresponds to the user pointing at the visual button 202 on the screen. Actual activation of a predetermined application processes of the system 100 can be triggered by the pixel motion in, for example, zone 322 "reaching" the interface 501 between zone 322 and portion 310. Sensitivity to actual touching of the screen 112 can be adjusted by varying the width of the portion 320. For example, if the touch zones 321–325 have a pixel size of 64×8 application actuation can be made to approximately coincide with the actual instantaneous touching of the screen 112.

As an advantage, the image-based touchscreen as described above can be adapted to almost any display terminal without a physical modification of the terminal itself. The camera 140 can be mounted on a bracket attached to the terminal, or on a tripod or other similar camera mounting support mechanism separate from the terminal.

This type of arrangement is well suited for a public kiosk which may already include an imaging subsystem for sensing the presence of a person in the kiosk or information booth.

It should be understood, that the camera 140 can be mounted on the side of the terminal 110 with the optical axis 142 having a horizontal orientation. In this case, the visual option buttons can be arranged in a vertical pattern.

Figure 6:
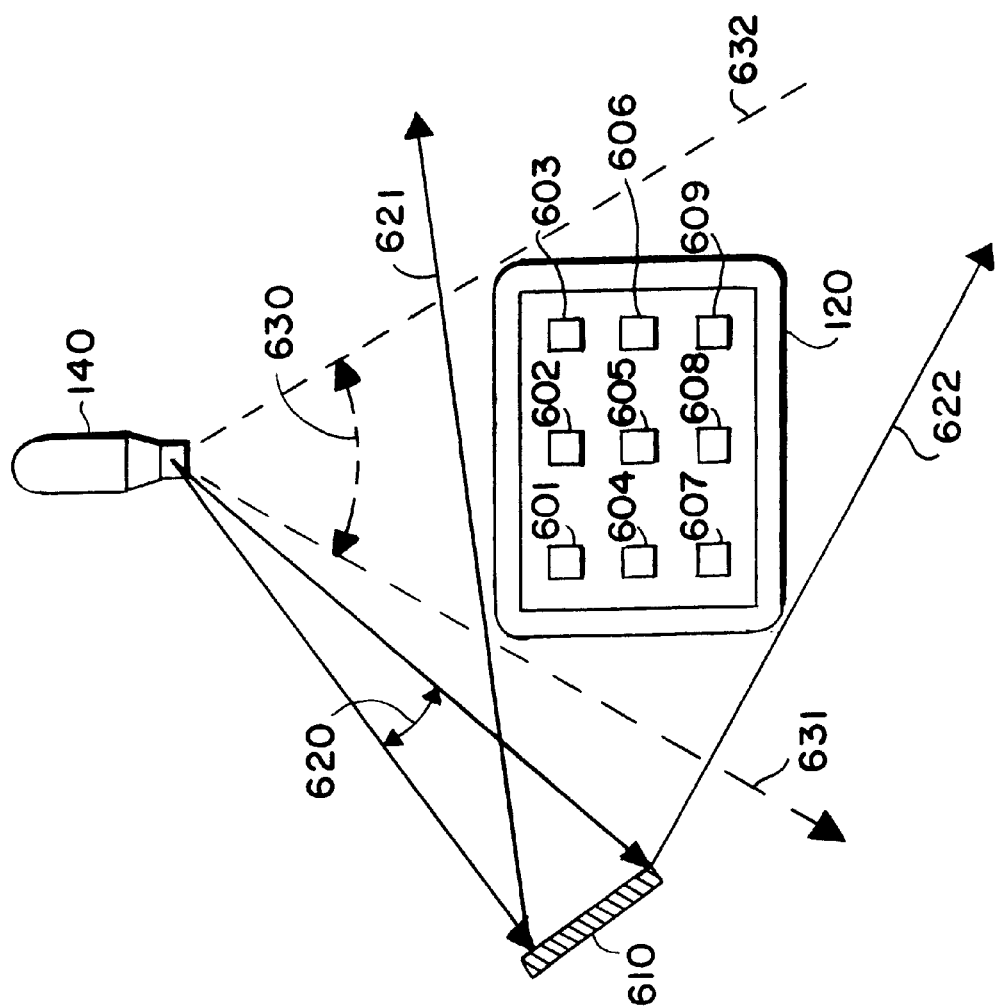
FIG. 6 is a schematic diagram of a touch activated system using a mirror.

In an alternative embodiment, as shown in schematically in FIG. 6, a mirror 610 is also mounted on the side of the display terminal 140 so that the mirror is in the scene 10 viewed by the camera. The mirror 140 is angled, for example at 45° with respect to the optical axis, such that a first angular portion 620 of the scene, e.g., the portion 620 between solid ray lines 621–622 lines, captures a horizontal view of the scene 10, and a second angular portion 630 between dashed ray lines 631–632 captures the vertical view of the scene as shown in FIG. 1. In this case, the image displayed on the terminal 120 can be a two-dimensional array of visual option n button s 601–609.

Figure 7:
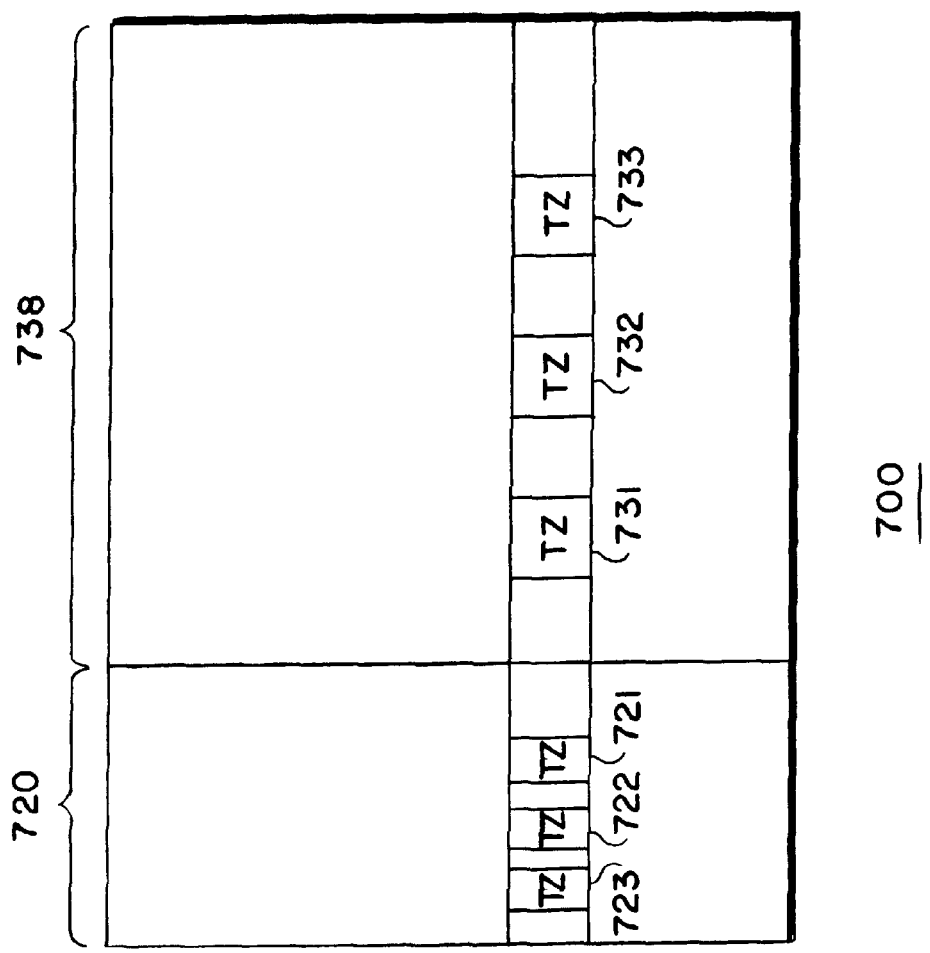
FIG. 7 is a frame grabbed by the system of FIG. 6.

FIG. 7 shows the corresponding reference frame 700. In the frame 700, a portion 720 of the scene is viewed horizontally across by the camera 140 via the mirror 610, and the portion 730 is directly viewed vertically down from the camera. The portion 720 can include touch zones 721–723, and the portion 730 includes touch zones 731–733. A modified image registration technique can be used to simultaneously detect pixel motion in zones 721–723 and zones 731–733. Pixel motion in zones 721 and 731 corresponds to button 601 being touched, while pixel motion in zones 723 and 733 corresponds to touching button 609, and so forth.

It should be understood that the mirror 610 can be mounted at other angles which are sufficient to detect localized motion for pixel portions in a two-dimensional arrangement using triangulation techniques. Two-dimensional motion detection can also be done using two cameras mounted at different angles with respect to each other. In this case, each camera can capture a different view of the scene, and the frames of the two cameras can be calibrated and compared with each other to determine two-dimensional pointing or touching activities.

It is understood that the above-described embodiments are simply illustrative of the principles of the invention. Various other modifications and changes may be made by those skilled in the art which will embody the principles of the invention and fall within the spirit and scope thereof.

I claim:

1. A touch activated computer system, comprising:
    a display terminal including a screen for displaying a computer generated image, at least a portion of the screen occupying a planar region;
    a camera having an optical axis aligned parallel to the planar region, the camera capturing frames representing a scene in front of the screen viewed from adjacent the screen, each frame including a plurality of pixel values;
    means for comparing the pixel values of a selected captured frame with pixel values of a reference frame of the scene, the scene of the reference frame being unoccupied; and
    means for selecting an action if the difference between the pixel values of a predetermined portion of the reference frame and a corresponding portion of the selected frame exceeds a predetermined threshold.

2. The system as in claim 1 further comprising:

a frame buffer for storing the pixel values of the reference and selected frames.

3. The system of claim 1 wherein the means for comparing includes a processor for registering images represented by the frames to determine the difference of the pixel values.

4. The system of claim 1 further comprising:

means for partitioning the reference and selected frames into a plurality of touch zones, and means for comparing the pixel values of a particular touch zone of the reference frame with the pixel values of a corresponding touch zone of the selected frame to select a particular action.

5. The system of claim 1 wherein the computer generated image includes a plurality of visual option buttons, each visual option button corresponding to a predetermined computer application, the selected action comprising execution of the computer application corresponding to a touched button.

6. The system of claim 1 further comprising a mirror mounted in a plane passing through the optical axis of the lens, the mirror reflecting to the camera a second scene also aligned with the planar region of the display, the second scene being substantially perpendicular to the unreflected captured scene, the camera being configured to also capture the second scene.

7. The system of claim 6 wherein the screen comprises a two-dimensional pattern of touch zones each corresponding to an action, the selection means detecting proximity to one of the touch zones based on the unreflected captured scene and the second scene.

8. A computer implemented method for activating a computer action, the method comprising the steps of:

displaying an image on a screen of a display terminal, the terminal including a screen at least a portion of which occupies a planar region;

capturing, from an orientation along an axis aligned parallel to the planar region, frames representing a scene in front of the screen viewed from adjacent the screen, each frame including a plurality of pixel values;

comparing the pixel values of a captured frame with pixel values of a reference frame of the scene, the scene of the reference frame being unoccupied; and selecting an action if the difference between the pixel values of a predetermined portion of the reference frame and the pixel values of a corresponding portion of the captured frame exceeds a predetermined threshold value.

9. The method of claim 8 further comprising the step of partitioning the reference and captured frames into a plurality of touch zones, the selection step comprising comparing the pixel values of a particular touch zone of the reference frame with the pixel values of a corresponding touch zone of the captured frame to select the action.

10. The method of claim 8 wherein the computer generated image includes a plurality of visual option buttons, each visual option button corresponding to a predetermined computer application, the selected action comprising execution of the computer application corresponding to a touched button.

11. The method of claim 8 further comprising the steps of:

reflecting a second scene also aligned with the planar region of the display, the second scene being substantially perpendicular to the unreflected captured scene; and capturing the second scene.

12. The method of claim 11 wherein the screen comprises a two-dimensional pattern of touch zones each corresponding to an action, and further comprising the step of detecting proximity to one of the touch zones based on the unreflected captured scene and the second scene.

* * * * *